UNITED STATES PATENT OFFICE.

HARRY LOUIS FRIBERGER, OF EUREKA, KANSAS, ASSIGNOR OF THREE-TENTHS TO VICTOR C. JOSLYN AND THREE-TENTHS TO CORNELIUS HORATIUS KELLER, BOTH OF EL PASO, TEXAS.

METHOD OF TREATING ORES.

1,224,917. Specification of Letters Patent. Patented May 8, 1917.

No Drawing. Application filed June 3, 1916, Serial No. 101,564. Renewed March 20, 1917. Serial No. 156,218.

*To all whom it may concern:*

Be it known that I, HARRY LOUIS FRIBERGER, a citizen of the United States, residing at Eureka, in the county of Greenwood and State of Kansas, have invented certain new and useful Improvements in Methods of Treating Ores, of which the following is a specification.

The present invention relates to a method of treating ores carrying gold and silver values in any form amenable to cyanid treatment or flotation.

Heretofore it has been proposed to float the valuable elements contained in the ores by using a relatively large quantity of water and a relatively small quantity of oily material.

It has also been proposed to float a portion of the metalliferous constituent of an ore, while in a liquid capable of acting as a solvent for some one or more of the constituents of said ore. This process, so far as I have been able to ascertain, has not heretofore been successfully applied to cyanid solutions, and in those places where this has been attempted, satisfactory results were not obtained.

In the treatment of ores by cyanid solution various bases in the ores give considerable trouble destroying cyanid and interfering with the gold and silver recovery. These bases being generally referred to as cyanicids.

In the proposed invention I remove by flotation these cyanicids such as copper, iron, lead, antimony, etc., as well as a portion of the precious metals, gold and silver before the cyanicids have a chance to exercise any deteriorating influence upon the cyanid solution.

In starting the process I start with cyanid solution of the ordinary strength, as used in the cyanidation of gold and silver ores, which strength will of course, depend more or less upon the amount of gold and silver or both in the ore under treatment, and also upon the nature of the gangue material and other factors. In the ordinary cyanid treatment this cyanid solution generally carries a protective alkali.

To the ore ground to the necessary fineness and diluted with the cyanid solution to the proper consistency I then add sufficient of the frothing medium hereinafter described to make upon agitation a metal-bearing froth. The apparatus employed may be any of the conventional types of flotation machinery such as the Callow cell, mineral separation or splash system. The resultant concentrate may then be marketed or treated. The tailings if necessary given a further treatment and the values contained in the solution recovered by any of the ordinary methods.

In all other methods of flotation where further treatment of tailings becomes necessary to recover the gold and silver by cyanidation the following tedious and expensive system is employed. The tailings are dewatered as close as any of the modern methods of filtration will permit and the remaining moisture contained varying from 30% to 50% must then be made up to the working strength with fresh cyanid and sufficient more cyanid solution added to give it the proper moisture ratio.

In preparing frothing medium I dissolve a resinous substance, such as ordinary rosin (anhydrid of abietic acid) in alcohol, the amount of rosin used being between 25 and 50% of the amount of alcohol used. I then add to this solution an amount of alkaline hydrate, particularly caustic soda, preferably just enough of this being employed to neutralize the entire amount of rosin used without leaving any material excess of alkali.

From this liquid thereby produced I distil off all or substantially all the alcohol for re-use. While this alcohol so recovered may not be entirely pure the impurities are such as will not injuriously affect the same for re-use in the process. This will leave a liquid, semi-liquid or solid residue according to the amount of alcohol remaining. This residue is soluble in water and is diluted to any convenient strength.

As a specific example of the process, the following is given:

10 pounds of commercial rosin are dissolved in 25 pounds of alcohol (about 90% strength) to which a sufficient amount of caustic soda solution of about 40% strength is added to just neutralize the material. The residue from this liquor after distillation is added to about 5 gallons of water.

A mill such as a ball, Chilian or stamp grinds an ore to necessary fineness with about .15% Kcn. (more or less) solution, a convenient moisture ratio being about 3.5 parts of solution to 1 part of ore.

Before this enters the flotation cell a small quantity of the frothing solution is continuously dripping into this pulp so that about one half pint of the frothing liquid would be added to each ton of dry ore contained in the pulp. Then by the agitation in the cell a metal bearing froth rises to the surface carrying what is generally termed concentrates and overflows or is scraped off. These concentrates upon being dewatered are ready for marketing.

The tailings or balance of the pulp is then settled or filtered and the liquid recovered is treated by zinc to recover the gold and silver in solution and then returned to the head of the mill to be used again as a crushing solution thereby conserving not alone the cyanid in solution but also all the frothing solution mixed with it.

It being found that 90% of the gold and 85% of the silver is a fair recovery and often 95% of the copper and as high as 80% of the lead have been floated. By this novel process I am enabled to obtain very excellent results upon very low grade material such as ores containing very small amounts of the precious metals where the gold and silver alone cannot be commercially recovered by cyanidation due to the cyanicids and where it is impossible to recover them by any other method of flotation.

Also there are millions of tons of tailings from cyanid plants that can be retreated with a profit by this process that cannot be retreated profitably by any other method of flotation due to the cyanid they contain.

What I claim is:

1. A process of treating ores containing precious metals, which consists in subjecting the same to the action of a liquid comprising a cyanid solution, a solution of a resinate and to the continued action of currents of air of sufficient volume to float any portion of the values amenable to flotation.

2. In the cyanidation of precious metal ores the step of frothing some constituents of the ore with subdivided currents of air while the said ore is mixed with a solution containing dissolved cyanid, and an alkali resinate.

3. The combined process of cyanidation and flotation of previous metals bearing ores which comprises dissolving a resinous substance in alcohol, adding an alkali to substantially complete neutralization, distilling off superfluous solvent and incorporating the resultant residue with a cyanid solution, treating the ore in said liquid with sub-divided air to float some constituents of the ore and thereby separate said constituents and after filtration removing the precious metals from the said solution.

4. A process of treating ores which comprises floating the material containing metal in a cyanid solution by introducing divided air currents, into a body of cyanid solution containing the finely divided ore, while in the presence of a material capable of increasing the affinity of the metal containing particles for the air bubbles.

In testimony whereof I affix my signature in presence of two witnesses.

HARRY LOUIS FRIBERGER.

Witnesses:
  H. E. CLARK,
  W. E. DRABRINK.